(No Model.)

G. R. CHEESMAN.
BICYCLE CRANK SHIELD.

No. 504,121. Patented Aug. 29, 1893.

WITNESSES
A. B. Degges
L. D. Heinrichs

INVENTOR
George R. Cheesman
by E. E. Masson, Attorney.

UNITED STATES PATENT OFFICE.

GEORGE R. CHEESMAN, OF AUBURN, NEW YORK.

BICYCLE-CRANK SHIELD.

SPECIFICATION forming part of Letters Patent No. 504,121, dated August 29, 1893.

Application filed May 31, 1893. Serial No. 476,020. (No model.)

*To all whom it may concern:*

Be it known that I, GEORGE R. CHEESMAN, a citizen of the United States, residing at Auburn, in the county of Cayuga, State of New York, have invented certain new and useful Improvements in Bicycle-Crank Shields, of which the following is a specification, reference being had therein to the accompanying drawings.

My invention relates to dress and mud guards for bicycles; and the objects of my improvement are to provide a simple and inexpensive attachment to the pedal cranks of bicycles to prevent the clothes of riders from coming in contact with the hub or inner end of the pedal crank of the machine, and thereby render the use of the ankle clasps unnecessary.

I attain these objects by the construction illustrated in the accompanying drawings in which—

Figure 1:
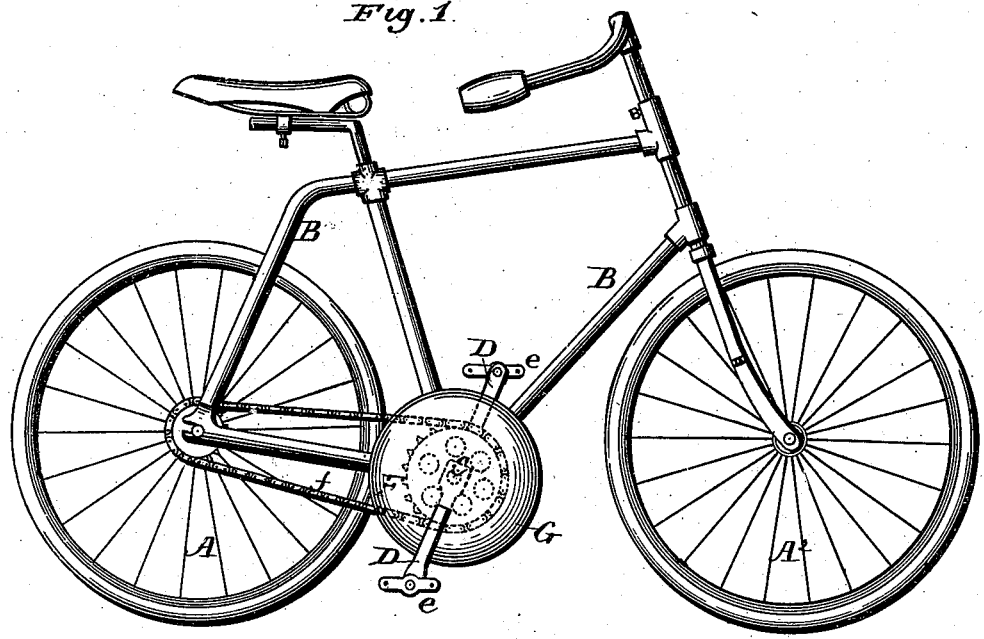
Figure 2:
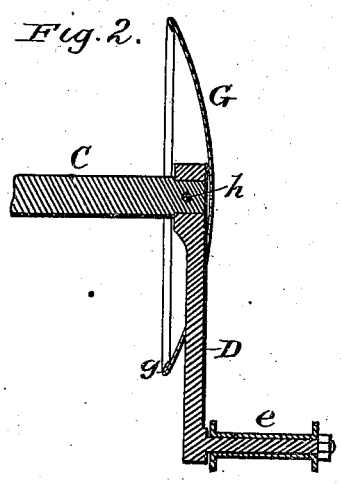
Figure 3:
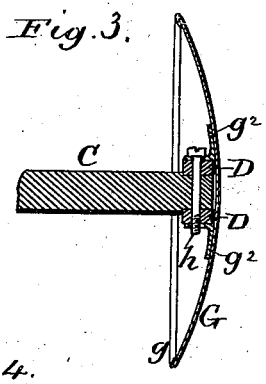
Figure 4:
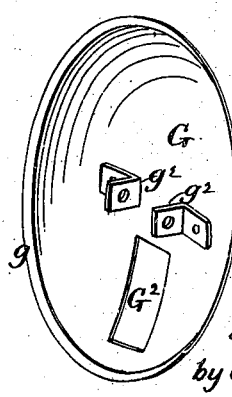

Figure 1 is a side view of a bicycle, the pedal cranks of which are provided with shields constructed in accordance with my invention. Fig. 2 is a central vertical section through the shield and pedal-crank. Fig. 3 is a central section through the shield and pedal-crank taken at a right angle to that shown in Fig. 2. Fig. 4 is a perspective view showing the inner side of the crank shield.

In said drawings A and $A^2$ represent respectively the rear and front wheels carrying the frame B of a bicycle, and the latter carries in suitable bearings, as usual, the shaft C. To each end of said shaft is secured the crank D carrying on its outer end the pedal e of any well known form. To protect the rider's clothes from contact against the hub or inner end of the crank, and also against the chain f and sprocket wheel F, generally placed alongside of one of the cranks. Said cranks are provided with circular shields G attached thereto adjacent to their hub. Said shields are concavo-convex and are preferably made of plated, tinned, or painted sheet-metal, although they may be made of woven wire, or of leather suitably convexed on one side and concaved on the opposite side. When made of metal the edge $g$ of the disk is preferably flanged and bent over the concave side to obtain a smooth edge.

To secure the shield to the hub of the crank, said shield is provided on its inner or concave side with two lugs $g^2$ at such distance apart as to embrace the sides of said hub. Each lug has a perforation to receive the ends of a rivet, bolt, or screw $h$, that is used also to secure the crank to the crank shaft C. Between the lugs $g^2$ and the rim $g$ of each shield, there is a rectangular slot or opening $G^2$, for the passage and reception of the body of the crank. The inner and outer edges of the opening $G^2$ are suitably beveled to form a smooth finish against the inner and outer sides of the crank. The shields being permanently attached to the machine are always in position to protect the clothes of the rider and render the use of ankle-clasps unnecessary.

Having now fully described my invention, I claim—

1. In combination with the pedal cranks of bicycles, circular shields secured to said cranks substantially as described.

2. In combination with the pedal cranks of bicycles, concavo-convex shields secured to said cranks substantially as described.

3. In combination with the crank shaft and pedal cranks of bicycles, concavo-convex shields having lugs projecting from their inner side and an opening $G^2$ between said lugs and the rim of the shield, and a bolt passing through said lugs, cranks, and their shaft substantially as described.

In testimony whereof I affix my signature in presence of two witnesses.

GEO. R. CHEESMAN.

Witnesses:
 WALTER A. BYRNE,
 Mrs. B. W. CRANE.